United States Patent
Kuwabara

(10) Patent No.: US 8,446,969 B2
(45) Date of Patent: May 21, 2013

(54) MULTI-CARRIER TRANSMISSION APPARATUS AND PEAK SUPPRESSION METHOD

(75) Inventor: Toshihide Kuwabara, Tokyo (JP)

(73) Assignee: NEC Corporation, Tokyo (JP)

( * ) Notice: Subject to any disclaimer, the term of this patent is extended or adjusted under 35 U.S.C. 154(b) by 471 days.

(21) Appl. No.: 12/738,132

(22) PCT Filed: Oct. 16, 2008

(86) PCT No.: PCT/JP2008/068700
§ 371 (c)(1),
(2), (4) Date: Apr. 15, 2010

(87) PCT Pub. No.: WO2009/051153
PCT Pub. Date: Apr. 23, 2009

(65) Prior Publication Data
US 2010/0220812 A1    Sep. 2, 2010

(30) Foreign Application Priority Data
Oct. 16, 2007    (JP) .................................. 2007-269069

(51) Int. Cl.
*H04K 1/10*    (2006.01)

(52) U.S. Cl.
USPC ........... 375/260; 375/261; 375/268; 375/271; 375/295; 375/296

(58) Field of Classification Search
USPC ................. 375/146, 260, 261, 268, 271, 285, 375/295, 296, 300, 322
See application file for complete search history.

(56) References Cited

U.S. PATENT DOCUMENTS

| | | | |
|---|---|---|---|
| 5,610,908 A | 3/1997 | Shelswell et al. | |
| 7,463,698 B2 * | 12/2008 | Fujii et al. | 375/303 |
| 7,583,586 B2 * | 9/2009 | Park et al. | 370/209 |
| 7,738,573 B2 * | 6/2010 | Cai et al. | 375/260 |
| 7,787,564 B1 * | 8/2010 | Anvari | 375/297 |
| 7,792,200 B2 * | 9/2010 | Molander | 375/260 |

(Continued)

FOREIGN PATENT DOCUMENTS

| | | |
|---|---|---|
| CN | 1965553 | 5/2007 |
| JP | 8-501195 | 2/1996 |

(Continued)

OTHER PUBLICATIONS

JP Office Action mailed Jul. 20, 2010 in corresponding Japanese Application No. 2007-269069 with English translation of enclosed wavy line portion.

(Continued)

*Primary Examiner* — Hirdepal Singh
(74) *Attorney, Agent, or Firm* — Young & Thompson

(57) ABSTRACT

Peak power is reduced without causing degradation of EVM. A multi-carrier transmission apparatus comprises: a first amplitude suppression unit suppressing amplitude of an oversampled multi-carrier signal; a first Fourier transform unit transforming an output signal of the first amplitude suppression unit into a frequency domain; a first signal suppression unit suppressing a signal outside a band of the output signal from the first Fourier transform unit under a predetermined condition; and a first inverse Fourier transform unit receiving a multi-carrier signal with respect to a signal within the band, receiving the output signal of the first signal suppression unit with respect to a signal outside the band, and inverse Fourier transforming these received signals.

3 Claims, 3 Drawing Sheets

U.S. PATENT DOCUMENTS

| | | | |
|---|---|---|---|
| 8,170,140 B2* | 5/2012 | Jiang | 375/296 |
| 2005/0276335 A1* | 12/2005 | Kumar | 375/260 |
| 2007/0089015 A1* | 4/2007 | Saul | 714/746 |
| 2008/0285432 A1* | 11/2008 | Ueng et al. | 370/203 |
| 2010/0008442 A1* | 1/2010 | Hellberg | 375/267 |
| 2012/0045006 A1* | 2/2012 | Chuang et al. | 375/267 |
| 2012/0307937 A1* | 12/2012 | Higuchi | 375/296 |

FOREIGN PATENT DOCUMENTS

| | | |
|---|---|---|
| JP | 2000-049745 | 2/2000 |
| JP | 2005-294996 | 10/2005 |
| JP | 2007-251909 | 9/2007 |
| JP | 2008-118552 | 5/2008 |
| WO | 2005096580 | 10/2005 |

OTHER PUBLICATIONS

Pisit Boonsrimuang, Katsuhiro Naito, Kazuo Mori, Tawal Paungma, Hideo Kobayashi, Simple PAPR Reduction Method for OFDM System by Using Dummy Sub-Carriers, IEICE Technical Report, vol. 106, No. 43, The Institute of Electronics, Information and Communication Engineers, May 11, 2006, pp. 37 to 42, RS2006-24.
International Search Report, PCT/JP2008/068700, Jan. 13, 2009.
CN Office Action dated May 16, 2012, with English translation.

* cited by examiner

MULTI-CARRIER TRANSMISSION APPARATUS AND PEAK SUPPRESSION METHOD

CROSS REFERENCE TO RELATED APPLICATION

This application claims the benefit of Japanese Patent Application No. 2007-269069, filed Oct. 16, 2007, which is hereby incorporated herein by reference thereto in its entirety.

TECHNICAL FIELD

The present invention relates to a multi-carrier transmission apparatus, a peak suppression method, and particularly to a peak power suppression technology suppressing a peak power of multi-carrier signal.

BACKGROUND ART

In recent years, a multi-carrier method, such as OFDM (Orthogonal Frequency Division Multiplexing), has become the focus of attention as a communication method to realize a fast wireless transmission. This method has merits that it is capable of a multi-path, resistant to fading or the like. However, as transmission signals convolved with a plurality of carriers are added on a time axis, a high peak power is caused, which has disadvantage in power efficiency of a transmission amplifier. Therefore, a clipping processing is occasionally employed to suppress the peak power.

For example, in Patent Document 1, a technology suppressing a ratio of transmission peak power to average power of the multi-carrier signal (termed as "a peak to average power ratio" hereinafter), without lowering a performance of demodulation in a receiving communication apparatus, and a transmission efficiency is disclosed. A multi-carrier signal transmission apparatus as noted in Patent Document 1 comprises:

i) a buffer to keep a multi-carrier signal;

ii) oversampling means oversampling the multi-carrier signal;

iii) detection means detecting a power level of a first threshold value or above in an oversampled multi-carrier signal;

iv) suppression means suppressing the power level of the oversampled multi-carrier signal to be not more than a second threshold value, if the detection means detects the power level of the first threshold value or above;

v) frequency band limiting means removing components outside a band contained in the multi-carrier signal whose power level is suppressed by the suppression means;

vi) replacement means replacing part of sub-carriers in the multi-carrier signal whose components outside the band are removed with the sub-carrier of the multi carrier signal kept in the buffer, followed by providing the resultant multi-carrier signal, in which part of sub-carriers are replaced, to the oversampling means;

vii) transmission means transmitting the oversampled multi-carrier signal if a power level of the first threshold value or above is not detected.

In accordance with the multi-carrier signal transmission apparatus having the above configuration, the replacement means replaces part of sub-carriers in the multi-carrier removed components outside the band with corresponding sub-carriers in the multi-carrier signal, kept in the buffer. Therefore, by a simple means, part of sub-carriers in the multi-carrier signal is prevented from non-linear distortion, which is generated by peak clipping, that is, a suppression of power level.

[Patent Document 1]
Japanese Patent Kokai Publication No. JP-P2005-294996A

SUMMARY

It should be noted that the content disclosed in Patent Document 1 is herein incorporated by reference thereto in its entirety.

Related technologies will be analyzed below from the standpoint of the present invention.

According to the technology in Patent Document 1, part of sub-carriers, whose components outside the band has been removed, in a multi-carrier signal are replaced with the sub-carrier in the multi-carrier signal kept in a buffer, and thus components outside the band are removed upon suppressing the peak. However, as frequency components outside the band are removed, the frequency characteristics becomes a little different from that of multi-carrier signal which is originally desired to be transmitted, and so there is fear that degradation of EVM would be caused.

Therefore, it is an objective of the present invention to provide a multi-carrier transmission apparatus without the degradation of EVM and a peak suppression method.

A multi-carrier transmission apparatus related to an aspect of the present invention comprises:

i) a first amplitude suppression unit suppressing amplitude of an oversampled multi-carrier signal;

ii) a first Fourier transform unit transforming an output signal of the first amplitude suppression unit into a frequency domain;

iii) a first signal suppression unit suppressing a signal outside a band of the output signal from said first Fourier transform unit under a predetermined condition; and iv) a first inverse Fourier transform unit receiving a multi-carrier signal with respect to a signal within the band, receiving the output signal from the first signal suppression unit with respect to a signal outside the band, and inverse Fourier transforming these received signals.

The multi-carrier transmission apparatus may comprise a mask table that has threshold values to each frequency formulating the signal outside the band, wherein the first signal suppression unit is configured to suppress a signal exceeding a threshold value gotten by referring to the mask table for each frequency signal.

The multi-carrier transmission apparatus may further comprise:

i) a second amplitude suppression unit suppressing amplitude of the output signal from the first inverse Fourier transformation unit;

ii) a second Fourier transform unit transforming an output signal from the second amplitude suppression unit into a frequency domain;

iii) a second signal suppression unit suppressing a signal outside a band of the output signal from the second Fourier transform unit under a predetermined condition; and iv) a second inverse Fourier transform unit receiving a multi-carrier signal with respect to a signal within the band, receiving the output signal from the second signal suppression unit with respect to a signal outside the band, and inverse Fourier transforming these received signals.

The multi-carrier transmission apparatus may comprise a mask table that has threshold values to each frequency signal formulating the signal outside the band, wherein the first and the second signal suppression units are configured to suppress a signal exceeding a threshold value gotten by referring to the mask table for each frequency signal.

A peak suppression method in accordance with another aspect of the present invention is a method suppressing a peak of transmitted signal, comprising:

i) suppressing amplitude of an oversampled multi-carrier signal;

ii) Fourier transforming the amplitude-suppressed signal;

iii) suppressing a signal outside a band of the Fourier transformed signal under a predetermined condition; and iv) receiving a multi-carrier signal with respect to a signal within a band, receiving suppressed the Fourier transformed signal under the predetermined condition with respect to a signal outside the band, and inverse Fourier transforming these received signals.

In a peak suppression method of the present invention, a step of suppressing a signal outside the band may suppress a signal for each frequency signal exceeding a threshold value gotten by referring to mask information, the mask information determining respective threshold values corresponding to each frequency signal formulating the signal outside the band.

In accordance with each of the aspects of the present invention, as a multi-carrier signal is used within the band, and the output signal from the signal suppression unit is used with respect to the signal outside the band, the peak power can be suppressed without degradation of EVM.

PREFERRED MODES

Figure 1:
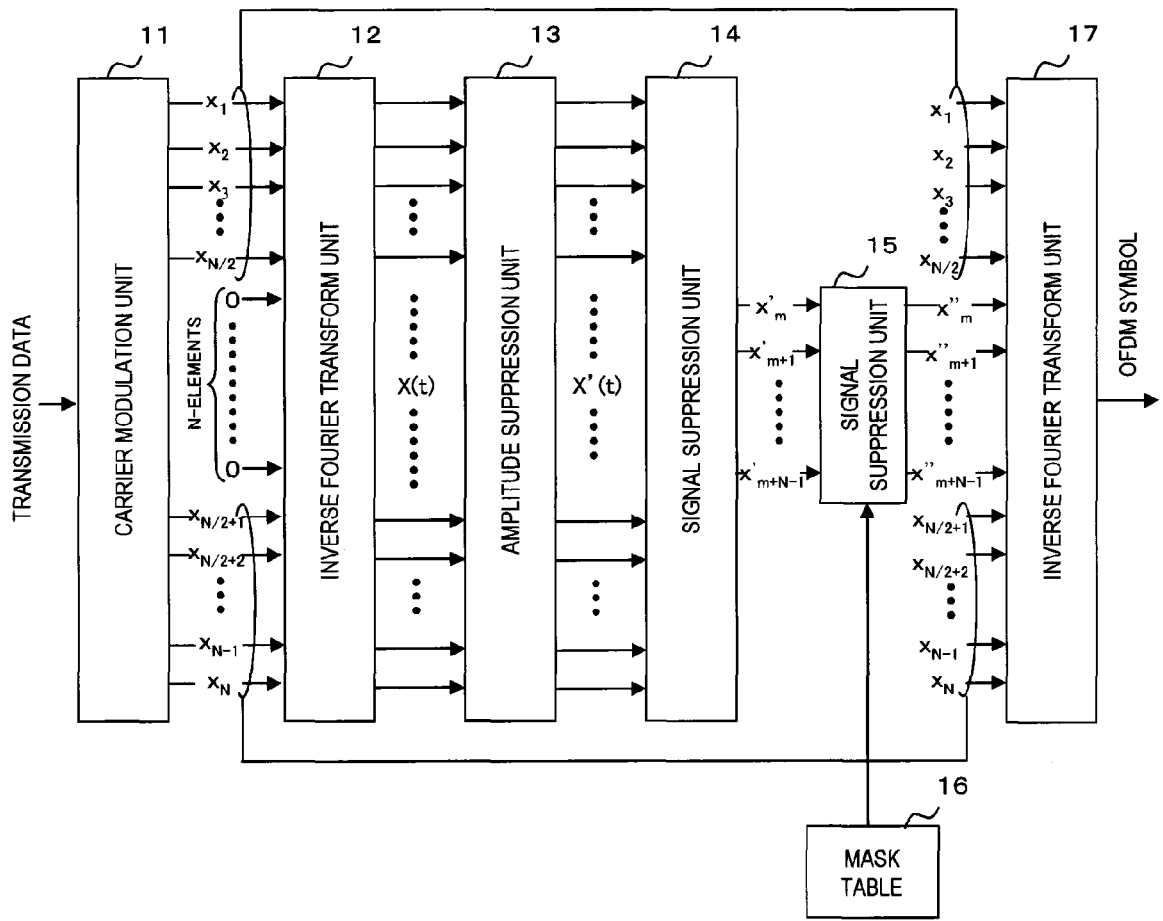
FIG. 1 is a block diagram showing the configuration of a multi-carrier transmission apparatus according to a first exemplary embodiment of the present invention.

A multi-carrier transmission apparatus in accordance with preferred exemplary embodiment of the present invention comprises:

a carrier modulation unit (11 in FIG. 1), converting a received transmission data into carrier signal;

an inverse Fourier transform unit (12 in FIG. 1), oversampling the converted carrier signal, and inverse Fourier transforming the oversampled signal;

an amplitude suppression unit (13 in FIG. 1), suppressing an inverse Fourier transformed output signal along an amplitude axis;

a Fourier transform unit (14 in FIG. 1), transforming an output signal from the amplitude suppression unit into a Fourier domain;

a signal suppression unit (15 in FIG. 1), suppressing a signal outside a band of the output signal from the Fourier transform unit under a predetermined condition; and an inverse Fourier transform unit (17 in FIG. 1), receiving a carrier signal with respect to a signal within the band, receiving the output signal from the first signal suppression unit with respect to a signal outside the band, and inverse Fourier transforming these received signals. Note, the reference symbols referring to the Drawings mentioned hereinabove within the parentheses are presented merely as an example for helping understanding of the disclosure, and not for the limitative purpose to the modes shown in the Drawings.

Preferred exemplary embodiment will now be described in more detail, by way of example, with reference to the drawings.

First Exemplary Embodiment

FIG. 1 is a block diagram showing the configuration of a multi-carrier transmission apparatus according to a first exemplary embodiment of the present invention. In FIG. 1, the multi-carrier transmission apparatus comprises a carrier modulation unit 11, an inverse Fourier transform unit 12, an amplitude suppression unit 13, a Fourier transform unit 14, a signal suppression unit 15, a mask table 16, and an inverse Fourier transform unit 17.

The result of inverse Fourier transformation by using a plurality of carrier signals as Fourier transform basis, which are orthogonal to one another, is generally used as one OFDM symbol. The original carrier signal is set as xn(n=1, 2, 3, . . . ), assuming that there are N elements.

A carrier modulation unit 11 converts a received transmission data into a carrier signal xn (n=1, 2, 3, . . . , N) with N elements.

An inverse Fourier transform unit 12 inverse Fourier transforms the carrier signal xn converted in the carrier modulation unit, and outputs signal X(t) as one OFDM symbol. An inverse Fourier transform unit 12 performs two-times oversampling before the inverse Fourier transformation, which reduces sidelobes. More specifically, while performing two-times oversampling and inverse Fourier transformation, N zeros are inserted in the center of the data sequence, like the following: xk=[x1, x2, x3 . . . , xN/2, 0, 0, 0, . . . (N zeros), 0, xN/2+1, xN/2+2, xN/2+3, . . . , xN], and the inverse Fourier transform unit inverse Fourier transforms xk, where the inverse Fourier transformation is generally performed by a fast inverse Fourier transform (IFFT).

An amplitude suppression unit 13 suppresses an output signal of the inverse Fourier transform unit 12 X(t) along an amplitude axis by clipping processing, and outputs signal X'(t). For example, at time t1, if mag(X(t1)), meaning an amplitude of X(t1), is more than a predetermined peak value P (mag(X(t1))>P), the following substitution is performed.

$$X'(t1)=X(t1)*P/\mathrm{mag}(X(t1))$$

Otherwise if the amplitude is not more than the peak value (mag(X(t1))<=P), it is still the same, $$X'(t1)=X(t1).$$

A Fourier transform unit 14 Fourier transforms a signal X'(t) generated by amplitude-suppressing in amplitude suppression unit 13, where the Fourier transformation is generally performed by a fast Fourier transform (FFT).

A signal suppression unit 15 limits an amplitude of x'k (k=m, m+1, . . . , m+N−1) not to exceed a mask limitation by referring to a mask table 16, where x'k is a signal outside a band for the result of Fourier transformation in Fourier transform unit 14. In other words, this unit limits amplitude of data with N elements picked up from the center of the result of Fourier transformation (data outside the band) by referring to a mask table 16, when necessary.

For example, k-th value stored in a mask table 16 is set as $M_k$. If mag(x'k)>$M_k$, $$x''k=x'k*M_k/\mathrm{mag}(x'k).$$

Otherwise if mag(x'k)<$M_k$, it is still the same $$x''k=x'k.$$

An inverse Fourier transfer unit 17 receives the original carrier signal with N elements, that is to say, an output signal within a band of the carrier modulation unit 11 (x1, x2, x3, ..., xN/2, xN/2+1, xN/2+2, xN/2+3, ..., xN) with respect to a signal within the band, receives an output signal of the signal suppression unit 15 x"k (k=m, m+1, ..., m+N−1) with respect to a signal outside the band, performs an inverse Fourier transformation, and outputs one OFDM symbol. In other words, data with N elements outside of frequency 265 axis are still the same, and on the other hand, this unit inverse Fourier transforms x"k=[x1, x2, x3, ... xN/2, x"m, x"m+1, x"m+2, . . . x"m+N−2, x"m+N−1, xN/2+1, xN/2+2, xN/2+3, ..., xN] again for data with N elements in the center of frequency axis, and gets one OFDM symbol as a signal X"(t) along time axis, where x"k is a signal amplitude limited for a waveform generated by a clipping processing.

Figure 2:
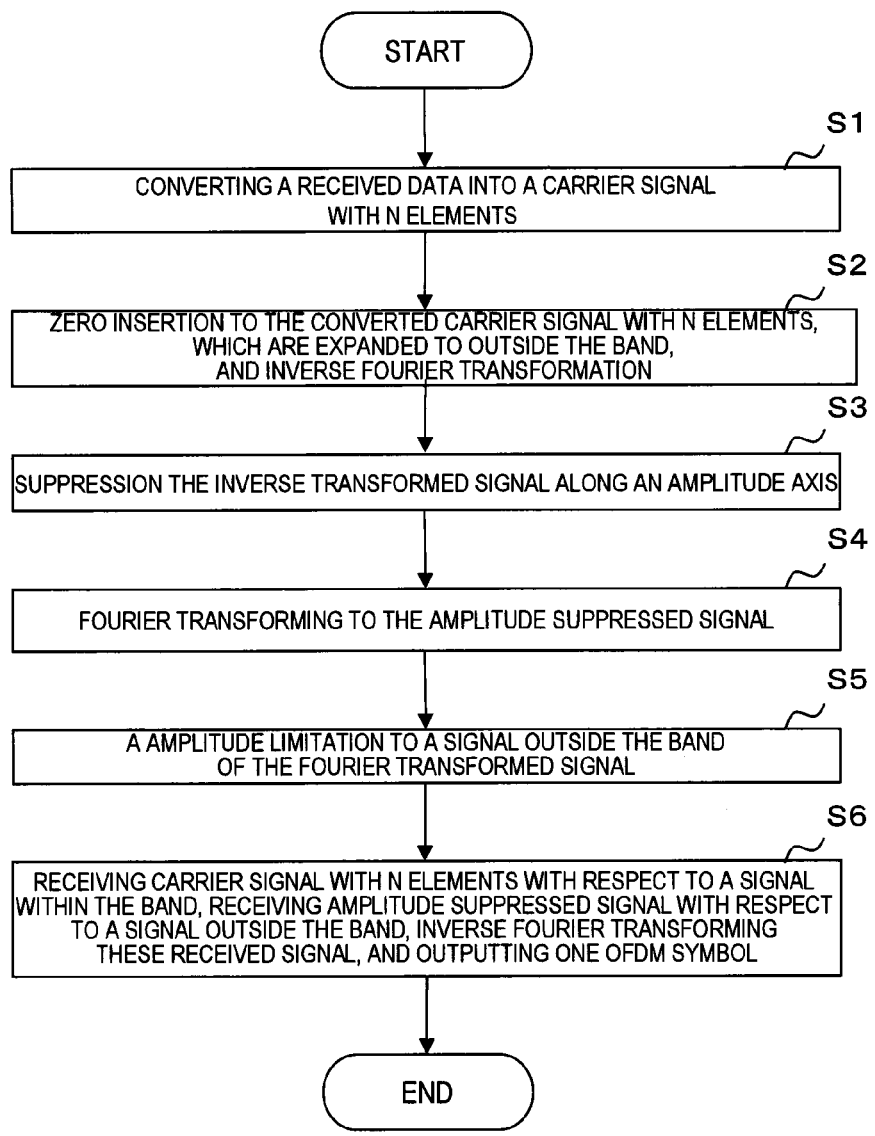
FIG. 2 shows a flow chart describing the steps of a multi-carrier transmission apparatus according to a first exemplary embodiment of the present invention.

Next, the operation of the multi-carrier transmission apparatus configured as shown above is explained. FIG. 2 shows a flow chart describing the steps of the multi-carrier transmission apparatus according to a first exemplary embodiment of the present invention.

In step S1, a received transmission data is converted into carrier signal xn (n=1, 2, 3, ..., N) with N elements.

In step S2, the converted carrier signal is oversampled, and inverse Fourier transformed. A signal X(t) corresponding to one OFDM symbol, whose amplitude is not limited, is outputted.

In step S3, the result of inverse Fourier transformation X(t) is suppressed along an amplitude axis by a clipping processing.

In step S4, a signal X'(t), which is generated by the amplitude suppression, is Fourier transformed.

In step S5, a signal x'k (k=m, m+1, . . . , m+N−1) is amplitude limited not to exceed a mask limitation by referring to a mask information, and a resultant signal x"k (k=m, m+1, . . . , m+N−1) is obtained, where x'k is a signal outside a band of the result of the Fourier transformation.

In step S6, the original carrier signal with N elements, that is to say, an output signal within the band (x1, x2, x3, . . . , xN/2, xN/2+1, xN/2+2, xN/2+3, . . . , xN), with respect to a signal within the band is received, a signal amplitude-suppressed in step S5 x"k(k=m, m+1, . . . , m+N−1) is received with respect to a signal outside the band, and these received signals are inverse Fourier transformed, and an amplitude-suppressed one OFDM symbol is outputted.

By comparing frequency characteristics of signal X"(t) with that of the original signal, the frequency characteristics are not changed within the band, where X"(t) is obtained as noted above, and corresponds to one OFDM symbol. On the other hand, outside the band, a signal X"(t) has unwanted frequency components caused by a clipping processing, while the original signal has no unwanted frequency components of sidelobes. However, signal X"(t) doesn't exceed a mask limitation by the unwanted frequency components caused. By taking a viewpoint of peak factor of the signal, it is not suppressed at the level of the first clipping processed signal, but more suppressed than the original signal. As a result, because it is still the same as the original within the band, a suppression of a peak power is achieved by reducing the unwanted frequency components to not more than the mask limitation despite that a degradation of EVM (Error Vector Magnitude) is not caused.

Second Exemplary Embodiment

Figure 3:
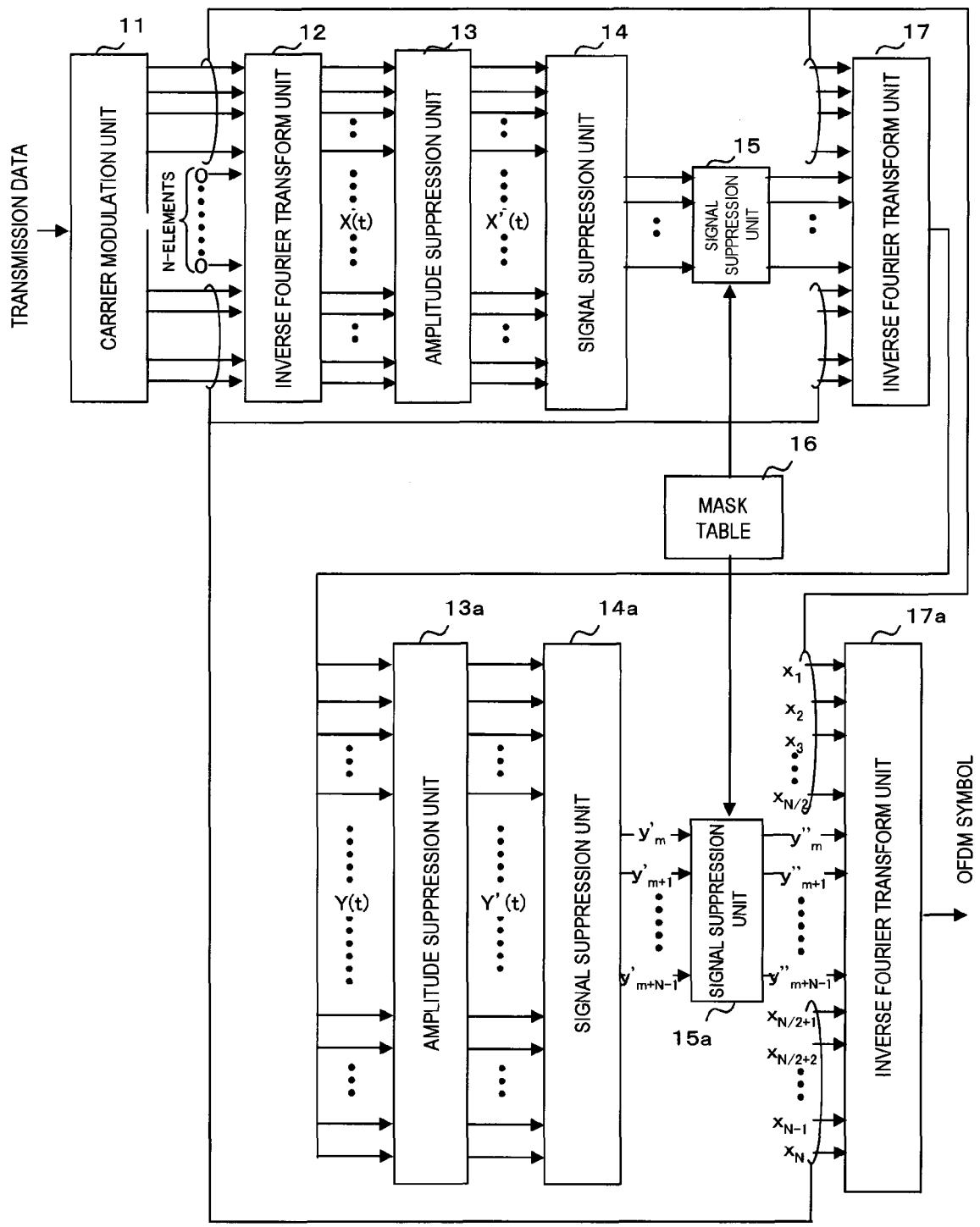
FIG. 3 is a block diagram showing the configuration of a multi-carrier transmission apparatus according to a second exemplary embodiment of the present invention.

FIG. 3 is a block diagram showing the configuration of a multi-carrier transmission apparatus according to a second exemplary embodiment of the present invention. The same symbol denotes the same thing in FIG. 1 and FIG. 3. A multi-carrier transmission apparatus in FIG. 3 further comprises an amplitude suppression unit 13a, a Fourier transform unit 14a, a signal suppression unit 15a and an inverse Fourier transform unit 17a, in addition to a multi-carrier transmission apparatus in FIG. 1.

An amplitude suppression unit 13a has the same function as the amplitude suppression unit 13, and suppresses an output signal from the inverse Fourier transform unit 17 Y(t) along an amplitude axis by clipping processing.

A Fourier transform unit 14a has the same function as the Fourier transform unit 14, and Fourier transforms a signal Y'(t) generated by amplitude-suppressing in the amplitude suppression unit 13a.

A signal suppression unit 15a has same function as the signal suppression unit 15, and suppresses an amplitude of a signal outside a band of the result of the Fourier transformation in the Fourier transform unit 14a y'm, y'm+1, . . . , y'm+N−1 not to exceed a mask limitation by referring to the mask table 16 in which mask information has been stored.

An inverse Fourier transform unit 17a has the same function as the inverse Fourier transform unit 17, receives the original carrier signal with N elements, that is to say, the output signal within a band from the carrier modulation unit 11 x1, x2, . . . , xN/2, xN/2+1, xN/2+2, . . . , xN with respect to a signal within the band, receives the output signal from the signal suppression unit 15a y"m, y"m+1, . . . , y"m+N−1 with respect to a signal outside the band, inverse Fourier transforms these received signals, and outputs amplitude-suppressed one OFDM symbol.

The multi-carrier transmission apparatus having configuration as noted above performs clipping processing, Fourier transformation and inverse Fourier transformation two times repeatedly. By using the configuration noted above, more effective suppression of a peak can be obtained than with the first exemplary embodiment.

The configuration as noted above may perform clipping processing, Fourier transformation and inverse Fourier transformation three times or more. Besides, provided that each processing for the amplitude suppression unit 13, the Fourier transform unit 14, the signal suppression unit 15, and the inverse Fourier transform unit 17 can be performed fast, the apparatus can be also configured so as to provide a signal switching unit before the amplitude suppression unit 13, thereby performing processing for the amplitude suppression unit 13, the Fourier transform unit 14, the signal suppression unit 15 and the inverse Fourier transform unit 17 repeatedly.

As many apparently widely different exemplary embodiments of the present invention can be made without departing from the spirit and scope thereof, it is to be understood that the invention is not limited to the specific exemplary embodiments thereof except as defined in the appended claims.

The invention claimed is:

1. A multi-carrier transmission apparatus comprising:
   i) a first amplitude suppression unit suppressing amplitude of an oversampled multi-carrier signal;
   ii) a first Fourier transform unit transforming an output signal of said first amplitude suppression unit into a frequency domain;
   iii) a first signal suppression unit suppressing a signal outside a band of an output signal from said first Fourier transform unit under a predetermined condition;
   iv) a first inverse Fourier transform unit receiving a multi-carrier signal with respect to a signal within the band, receiving an output signal from said first signal suppression unit with respect to a signal outside the band, and inverse Fourier transforming these received signals;

v) a second amplitude suppression unit suppressing amplitude of an output signal from said first inverse Fourier transform unit;

vi) a second Fourier transform unit transforming an output signal of said second amplitude suppression unit into a frequency domain;

vii) a second signal suppression unit suppressing a signal outside a band of an output signal from said second Fourier transform unit under a predetermined condition; and viii) a second inverse Fourier transform unit receiving the multi-carrier signal with respect to the signal within the band, receiving an output signal from said second signal suppression unit with respect to a signal outside the band, and inverse Fourier transforming these received signals.

2. The multi-carrier transmission apparatus according to claim 1, comprising a mask table which has threshold values corresponding to each frequency formulating said signal outside the band, wherein said first signal suppression unit is configured to suppress a signal exceeding a threshold value gotten by referring to said mask table for each frequency signal.

3. The multi-carrier transmission apparatus according to claim 1, comprising a mask table which has threshold values corresponding to each frequency signal formulating said signal outside the band, wherein said first and second signal suppression units are configured to suppress a signal exceeding a threshold value gotten by referring to said mask table for each frequency signal.

* * * * *